United States Patent
Kulkarni et al.

(10) Patent No.: US 11,947,558 B2
(45) Date of Patent: Apr. 2, 2024

(54) BUILT-IN ANALYTICS FOR DATABASE MANAGEMENT

(71) Applicant: Kyndryl, Inc., New York, NY (US)

(72) Inventors: Sudhanva Kulkarni, Bangalore (IN); Nalini M, Chennai (IN); Gautam K. Bhat, Kadri (IN); Muniyandi Perumal Thevar, Madurai (IN)

(73) Assignee: KYNDRYL, INC., New York, NY (US)

( * ) Notice: Subject to any disclaimer, the term of this patent is extended or adjusted under 35 U.S.C. 154(b) by 224 days.

(21) Appl. No.: 17/096,166

(22) Filed: Nov. 12, 2020

(65) Prior Publication Data

US 2022/0147536 A1    May 12, 2022

(51) Int. Cl.
*G06F 16/25* (2019.01)
*G06F 16/2457* (2019.01)
*G06F 16/248* (2019.01)
*G06F 21/62* (2013.01)

(52) U.S. Cl.
CPC ...... *G06F 16/252* (2019.01); *G06F 16/24573* (2019.01); *G06F 16/248* (2019.01); *G06F 21/6227* (2013.01)

(58) Field of Classification Search
CPC ............ G06F 16/24573; G06F 16/248; G06F 16/252; G06F 21/6227
See application file for complete search history.

(56) References Cited

U.S. PATENT DOCUMENTS

| | | | |
|---|---|---|---|
| 7,698,348 B2 | 4/2010 | Walker | |
| 8,429,243 B1 | 4/2013 | Wang | |
| 8,886,628 B1* | 11/2014 | Taswell | G06F 16/958 707/707 |
| 9,489,119 B1* | 11/2016 | Smith, Jr. | G06F 3/04845 |
| 9,652,542 B2 | 5/2017 | Kottu | |
| 9,692,662 B2 | 6/2017 | Chan | |
| 2009/0259924 A1* | 10/2009 | Amann | G06F 3/061 714/E11.031 |
| 2009/0300544 A1* | 12/2009 | Psenka | H04L 63/10 715/810 |
| 2010/0262625 A1* | 10/2010 | Pittenger | G06F 21/6227 707/783 |
| 2013/0290300 A1 | 10/2013 | Chen | |
| 2014/0229491 A1 | 8/2014 | Bhattacharjee | |

(Continued)

OTHER PUBLICATIONS

Raasveldt, Monet DBLite: An Embedded Analytical Database, Jun. 10-15, 2018, SIGMOD, pp. 1837-1838 (Year: 2018).*

(Continued)

*Primary Examiner* — Etienne P Leroux
*Assistant Examiner* — J Mitchell Curran
(74) *Attorney, Agent, or Firm* — Dan Housley; Andrew M. Calderon; Calderon Safran & Cole P.C.

(57) ABSTRACT

A computer-implemented method, computer system, and computer program product for managing a database are disclosed. Features thereof include selecting data lines for analytics, each data line including original data, and adding, to each of the selected data lines, a set of additional bytes to represent metadata about a corresponding one of the data lines. The features further include receiving a request to receive a first data line, and reading a first set of additional bytes corresponding to the first data line.

17 Claims, 8 Drawing Sheets

(56) References Cited

U.S. PATENT DOCUMENTS

| | | | |
|---|---|---|---|
| 2015/0081640 A1 | 3/2015 | Long | |
| 2016/0371315 A1 | 12/2016 | Kwon | |
| 2017/0262502 A1 | 9/2017 | Rastunkov | |
| 2017/0300561 A1 | 10/2017 | Kannan | |
| 2017/0300712 A1* | 10/2017 | Timmerman | ....... G06F 16/2456 |
| 2018/0139224 A1* | 5/2018 | Arnell | ................. H04L 63/1425 |
| 2021/0192068 A1* | 6/2021 | Rogers | .................. G06F 21/602 |

OTHER PUBLICATIONS

Raasveldt, Data management for Data Science Towards Embedded Analytics, Jan. 12-15, 2020, CIDR (Year: 2020).*
Mell et al., "The NIST Definition of Cloud Computing," Recommendations of the National Institute of Standards and Technology, U.S. Department of Commerce, Special Publication 800-145, Sep. 2011, 7 pages.
Stonebraker et al., "SciDB: A Database Management System for Applications with Complex Analytics," Computing in Science & Engineering, vol. 15, Issue 3, pp. 54-62, Feb. 2013.

\* cited by examiner

BUILT-IN ANALYTICS FOR DATABASE MANAGEMENT

BACKGROUND

The present invention relates to database management, and more specifically, to analytics built into data in a database.

Database management can be performed using analytics to generate insight about the data contained in a database. In conventional systems, the analytic data is gathered by monitoring traffic into and/or out of a database system. For example, requests for particular data and/or data packages can be monitored by software outside of the database system. However, doing so can require additional software development, computing resources, and time.

SUMMARY

According to an embodiment of the present disclosure, a computer-implemented method of managing a database includes selecting data lines for analytics, each data line including original data, and adding, to each of the selected data lines, a set of additional bytes to represent metadata about a corresponding one of the data lines. The features further include receiving a request to receive a first data line, and reading a first set of additional bytes corresponding to the first data line.

According to other embodiments of the present disclosure, a computer system and a computer program product for managing a database can include the same features as the computer-implemented method.

DETAILED DESCRIPTION

Figure 1:
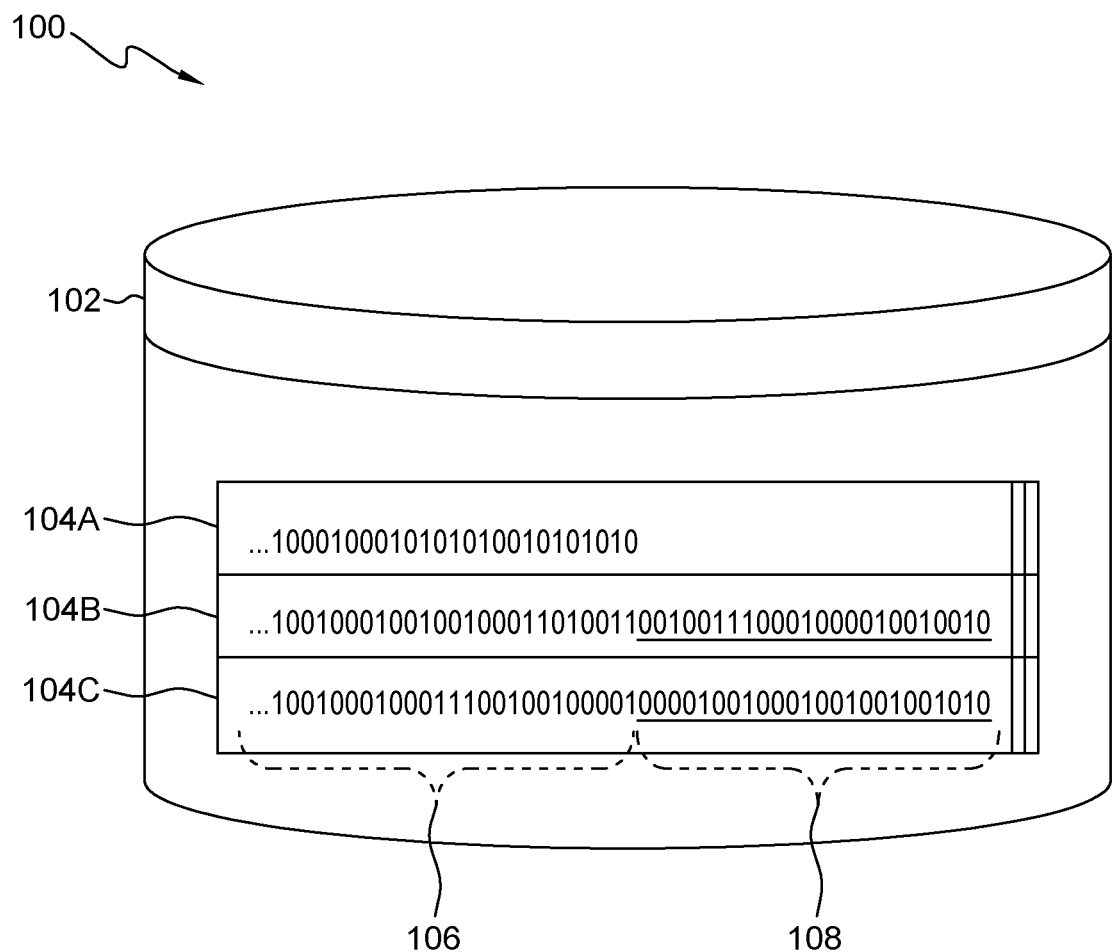
FIG. 1 is a schematic representation of a database controlled by a database management system with built-in analytics, in accordance with an embodiment of the present disclosure.

The present disclosure presents a system and method for storing metadata in a line of data in the database itself. For example, this metadata (i.e., data about data) can include a running tally that captures the number of hits on the selected data in the database itself. Thereby, users can directly query the database to find the analytic data instead of having to use a separate analytics tool. In some embodiments, some or all of the data in the database can be selected for analytics information. Then, the number of hits can be recorded in additional bytes (called "analytical digits" or "anadigits") that are added to the data in each of the selected data. Whenever the data receives a hit, the execution plan of the database management system includes a step to update the anadigits to increment the hit count for the data.

In one example situation, a bank has a webpage with a list of links to various financial products on it. Every time a user clicks on a link, the hit will be recorded in anadigits. The bank can then query the database to see the popularity of the bank's various product offerings. Thereby, the bank can promote, alter, or maintain the products depending on their popularities.

In another example situation, different metadata can be included in the anadigits. In such an example, a website host server can include different target audiences in the anadigits of its database, such as in advertisements. If a user of the website has agreed to allow the use of cookies, then host server can analyze the user's computer to determine relevant information about the user. This information can be used to determine which target audience the user falls into. Then advertisements with that target audience listed in its anadigits can be displayed to the user, while advertisements with different target audiences listed in their anadigits may not be displayed to the user. Thereby, the advertisements can be targeted to the user, which increases the effectiveness of the advertisements and informs the use of products that may be useful to them.

In some embodiments, to create a database with built-in storage of analytics, the data owner can select which data should have analytics (e.g., public data) and which data should not have analytics (e.g., private data). Then, the database management execution process can allocate additional memory for storing the selected data with analytical data (i.e., anadigits). In such embodiments, the unselected data can include a header and column data (a.k.a. the "original data"), whereas the selected data can include the original data (i.e., a header and column data) and anadigits. Thereby, the analytics information can be stored in the actual data storage and not in a data table field or row. In some embodiments, the number of bytes allotted to the anadigits can exceed the number needed for storing hit information. Thereby, for example, access information can be stored in the anadigits for closed data. Such closed data can be accessed by, for example, certain users, groups, classes/types of external parties, the identities of which can be stored in the anadigits.

In some embodiments, whenever a particular data of the selected data is requested for viewing by an external party (e.g., queried from websites, social media, database tools, or application services), the number of hits of the particular data can be tallied and retrieved. More specifically, the database query is sent to the database cache. If the query is for data that is already in the cache, then the data is returned immediately and the anadigit hit count is updated per the execution plan process. The execution plan process can also include updating a data dictionary table that has metadata about the data and/or details about the external party. More specifically, the information that is updated in the data dictionary table can be, for example, the table name, the field name, the actual data, the number of hits on the data and/or information about the external party who requested the data.

However, if the requested data isn't already in the cache, then the query syntax can be checked and optimized according to a standard. Then the query can be sent for execution, and the execution plan process can retrieve the data from an index (if the database table has an index) or from the table directly. Then the data is returned to the requester, and the anadigit hit count is updated per the execution plan process. The execution plan process can also include updating the data dictionary table.

In some embodiments, to retrieve the analytics, the data owner can send an analytics request to the database. The database can analyze each data field, parse the analytics data, and format it according to the execution plan. The resulting analytics data that is returned to the owner can include, for example, hits, requester details, and timestamp and location details.

In some instances, the external party may request information that they do not have access to (e.g., closed or private data). In these cases, when the execution plan determines that the requested data does not include anadigits or that the data is closed, then a failure-to-retrieve message can be returned to the external party (e.g., "Data not accessible"). Such a hit can be recorded in the data dictionary table or elsewhere in the database. The recording can include a footprint with information such as, for example, the search string/request, requester details, location, and time of request. Similarly, if the data being searched for does not exist, then a failure-to-retrieve message can be returned to the external party (e.g., "Data not present"). Such a hit can be recorded in the data dictionary table or elsewhere in the database. The recording can include a footprint with information such as, for example, the search string/request, requester details, location, and time of request. Thereby, the data owner can see what external parties are searching for and may act on that information as appropriate. For example, if a company's website is searched for a product feature that is absent from their product line, then the company may decide to add the product feature. For another example, if the company's website is searched for private information repeatedly, then the company may decide to enhance the security of that private information.

The external parties can search for data directly (e.g., on the company's website) or indirectly (e.g., through a search engine or social media platform). In the case of a direct search, the process for retrieval can be as described above. But in the case of an indirect search, the data owner may work with the indirect search provider so that the database management system can properly track the hits on a separate search-term database. For example, different external parties can use different words to search for the same data. Therefore, the database management system can analyze the terms from the indirect search to determine what data the user was searching for. Once the user's intent has been established, the database management system can record the hits in the anadigits of the corresponding lines of data in the search-term database according to the execution plan. Then the search results or an error message can be returned to the external party according to the execution plan. Thereby, data that is not accessible (e.g., private) can remain inaccessible. Furthermore, since indirect searches can unlock multiple data points, if the root data is inaccessible, then any downstream branch of that root is also inaccessible.

Overall, the present disclosure describes a useful system and/or method. In some embodiments, analytics storage is provided that allows in-house analytical functions to be performed using in-built data repository management system. In some embodiments, data is parameterized to separate accessible data from inaccessible data. In some embodiments, the data repository management system interfaces with another party to establish a user's search intent so that the data repository management system and the other party, working together, can provide an appropriate response to the user.

FIG. 1 is a schematic representation of database 100 with built-in analytics. Database 100 can be controlled by database management system (DBMS) 102, which can be, for example, a relational database management system. In the illustrated embodiment, database 100 includes three lines of data 104A-104C (collectively, data 104). Each of the three data 104A-104C includes an original data portion 106 (e.g., the header and column data). In addition, the data owner (not shown) has selected data 104B and 104C to include their own independent analytics, so anadigit portions 108 have been added to the original data portions 106 of data 104B and 104C.

In some embodiments, anadigit portions 108 can each include four bytes of anadigits, although in other embodiments, the number of bytes of anadigits is an amount other than four bytes. The reasons for adding analytics to data 104B and 104C can be numerous including, for example, that data 104B and 104C are public or semi-public (e.g., closed to some and open to others). On the other hand, the data owner has not selected data 104A to include analytics, which can be for any number of reasons including, for example, that data 104A is private. The anadigits can represent different and/or multiple types of information. Such information can include, for example, the number of hits on the data, information about entities who have access/attempted to access the data (e.g., to the extent that those entities have agreed to share such data), the subject matter of the data (e.g., topic or item described in/by the data), the preferred audience of the data, outcome information (e.g., past success or failure of a process), whether the data is public or private, whether the data is writable/editable, whether the data is open or closed, entities who have access to the data (e.g., an allowlist), and entities who are denied access to the data (e.g., a blocklist).

Having a set of anadigits incorporated into selected lines of data 104 allows for metadata to be stored in each line of data 104 itself. Thereby, the metadata can be accessed by DBMS 102 directly without requiring third-party software to monitor traffic. Furthermore, each individual anadigit portion 108 can be updated by DBMS 102 when appropriate, for example, to provide a real-time count of the hits on one of the selected data 104 (e.g., data 104B or 104C). Thereby, the analytics can be on each data 104 separately, as opposed to merely having analytics on a field of data across all lines of data 104 collectively.

Figure 2A:
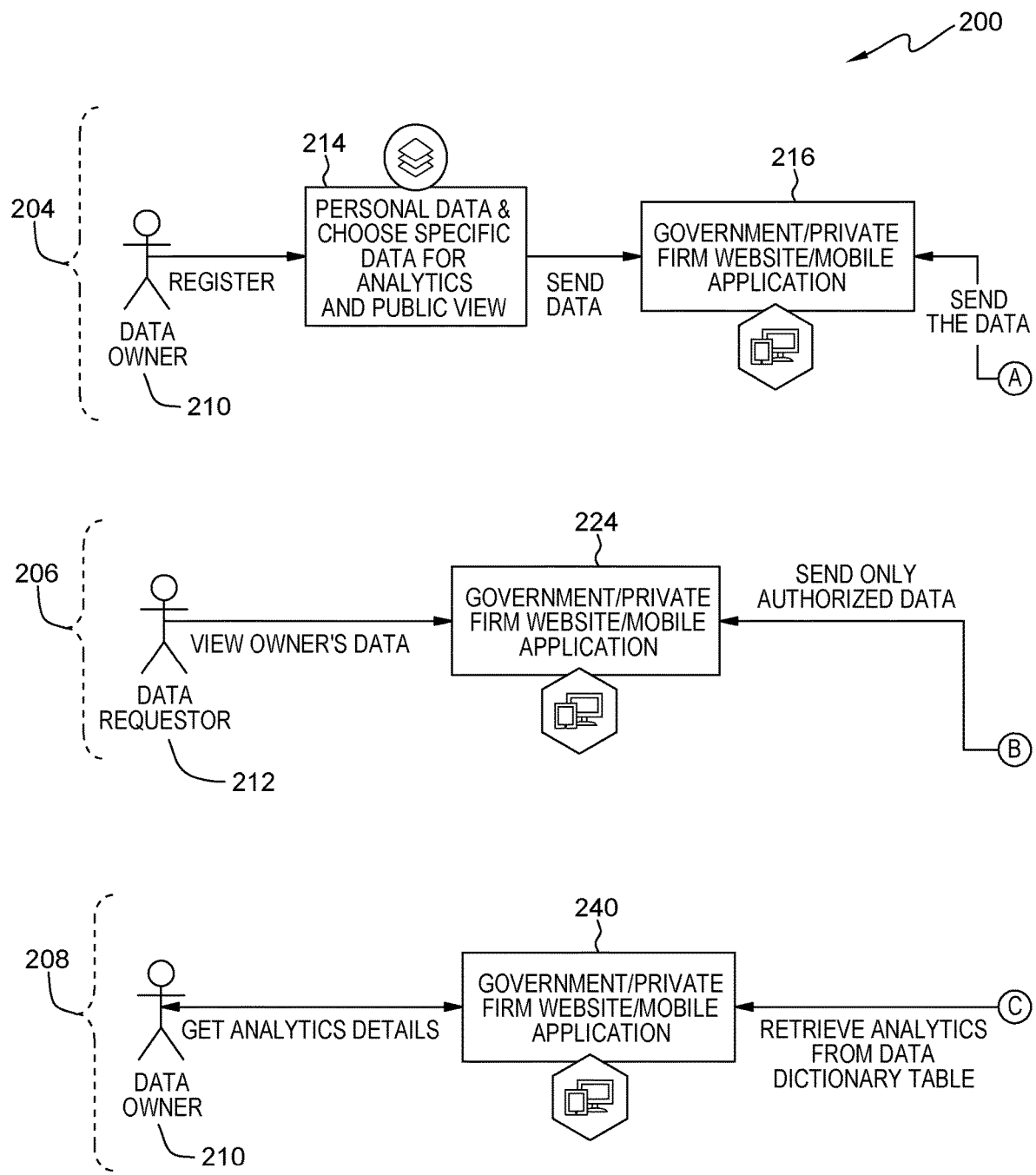
FIGS. 2A and 2B are a schematic architectural flowchart of creating and using a database system with built-in analytics, in accordance with an embodiment of the present disclosure.
Figure 2B:
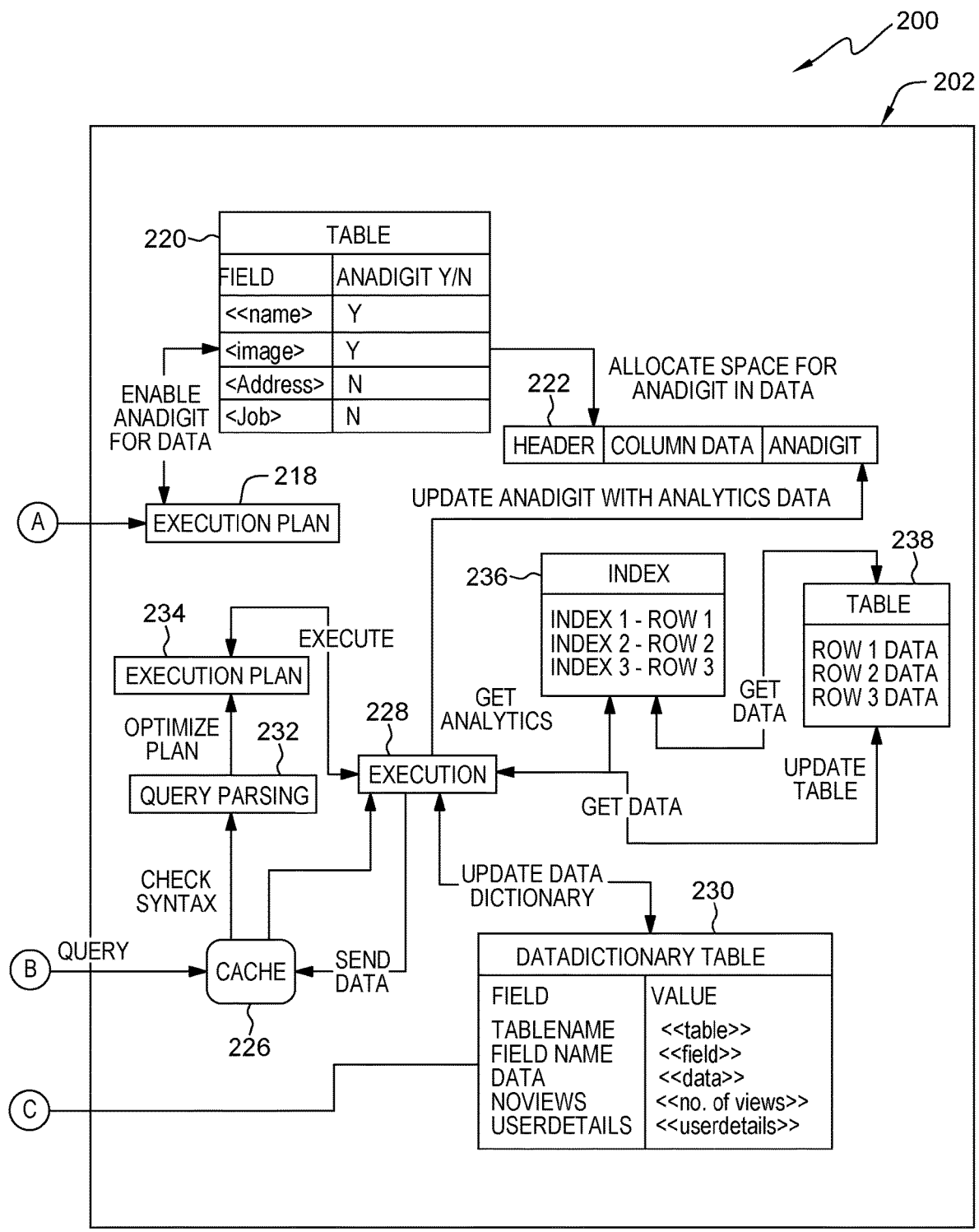

FIGS. 2A and 2B are a schematic architectural flowchart 200 of creating and using database system 202 with built-in analytics. Database system 202 can be, for example, a data server belonging to a website host or developer. Flowchart 200 includes three perspectives of using database system 202 depending on who the user is and what the user is doing. More specifically, there can be registration perspective 204, requester perspective 206, and analytics perspective 208. In registration perspective 204, data owner 210 can select which lines of data should include analytics. In requester perspective 206, data requester 212 can search and/or be sent data utilizing, for example, data repository management functions. In analytics perspective 208, data owner 210 can retrieve analytics data from the anadigits in the data.

In the illustrated embodiment, at block 214 of registration perspective 204, data owner 210 can assign properties to their data using, for example, a computing device (e.g., smartphone, laptop computer, or desktop computer). The properties of the data can include, for example, which data to include analytics on, which data is private, which data is public, who can access which data, what the subject matter of the data is, the preferred audience for the data, whether the data is writable/editable, etc. At block 216, a portal is used to access database system 202 (for example, using the computing device from block 214). This portal can be, for example, a private/public/government website or a mobile/smartphone application. The data properties are then received per the execution plan at block 218. At block 220, anadigits for the lines of data that were selected for analytics are enabled per the execution plan, so each of the selected lines of data can be configured as shown in block 222.

In the illustrated embodiment, at block 224 of requester perspective 206, data requester 212 uses a computing device (e.g., smartphone, laptop computer, or desktop computer) to access database system 202 through a portal. This portal can be, for example, a private/public/government website or a mobile/smartphone application that requests access to data in database system 202, for example, using a query. The query can be received by the cache at block 226, and if the same query has been executed already, then the cache can immediately return the cached data (assuming that data requester 212 would have access to the requested data). If this occurs, then the execution module at block 228 can update the anadigits for the relevant line(s) of data at block 222. This update can include, for example, incrementing the number of views count and/or adding details about data requester 212. Furthermore, the execution module at block 228 can update the data dictionary table at block 230, which can be a new data dictionary for storing analytics details for data from block 220. For example, the data dictionary table can include the following details about the most recent query: Table Name; Field Name; Actual Data; Number of hits; and/or Users who viewed the data (including available details about data requester 212).

If the query results were not immediately available in cache, then the query is parsed, and its syntax is checked at block 232. This allows for the optimization of the query under the execution plan at block 234. Then, at block 228, the execution module can retrieve the data from the index at block 236 or directly from the table at block 238 (assuming data requester 212 has access to the requested data). However, the execution module strips off anadigit portion 108 (shown in FIG. 1) so that only original data portion 106 (shown in FIG. 1) is sent to data requester 212. The execution module can then send the requested data through the cache at block 226 and to data requester 212 via the portal at block 224. In addition, the execution module at block 228 can update the anadigits for the relevant line(s) of data at block 222. This update can include, for example, incrementing the number of views count and/or adding details about data requester 212. Furthermore, the execution module at block 228 can update the data dictionary table at block 230.

In the illustrated embodiment, at block 240 of analytics perspective 208, data owner 210 uses a computing device (e.g., smartphone, laptop computer, or desktop computer) to access database system 202 through a portal. This portal can be, for example, a private/public/government website or a mobile/smartphone application. In analytics perspective 208, data owner 210 can retrieve specified analytics data from data system 202. Thus, the query from data owner 210 can be received by the data dictionary table at block 230, and if the same query has been executed already, then the data dictionary table will immediately return the analytics data. If not, then the query is sent to the execution module at block 228. Then the execution module can retrieve the relevant anadigit portions 108 of the data (e.g., from blocks 220, 222, 236 and/or 238) based on the query. Then, the data dictionary table can be updated at block 230, and the analytics data can be sent through the portal to data owner 210 at block 240.

Thereby, data owner 210 can register data and retrieve analytics about the data for which analytics were enabled per the execution plan. In addition, data requester 212 can receive data that data requester 212 has access to while database system 202 logs metadata about the request per the execution plan.

Figure 3:
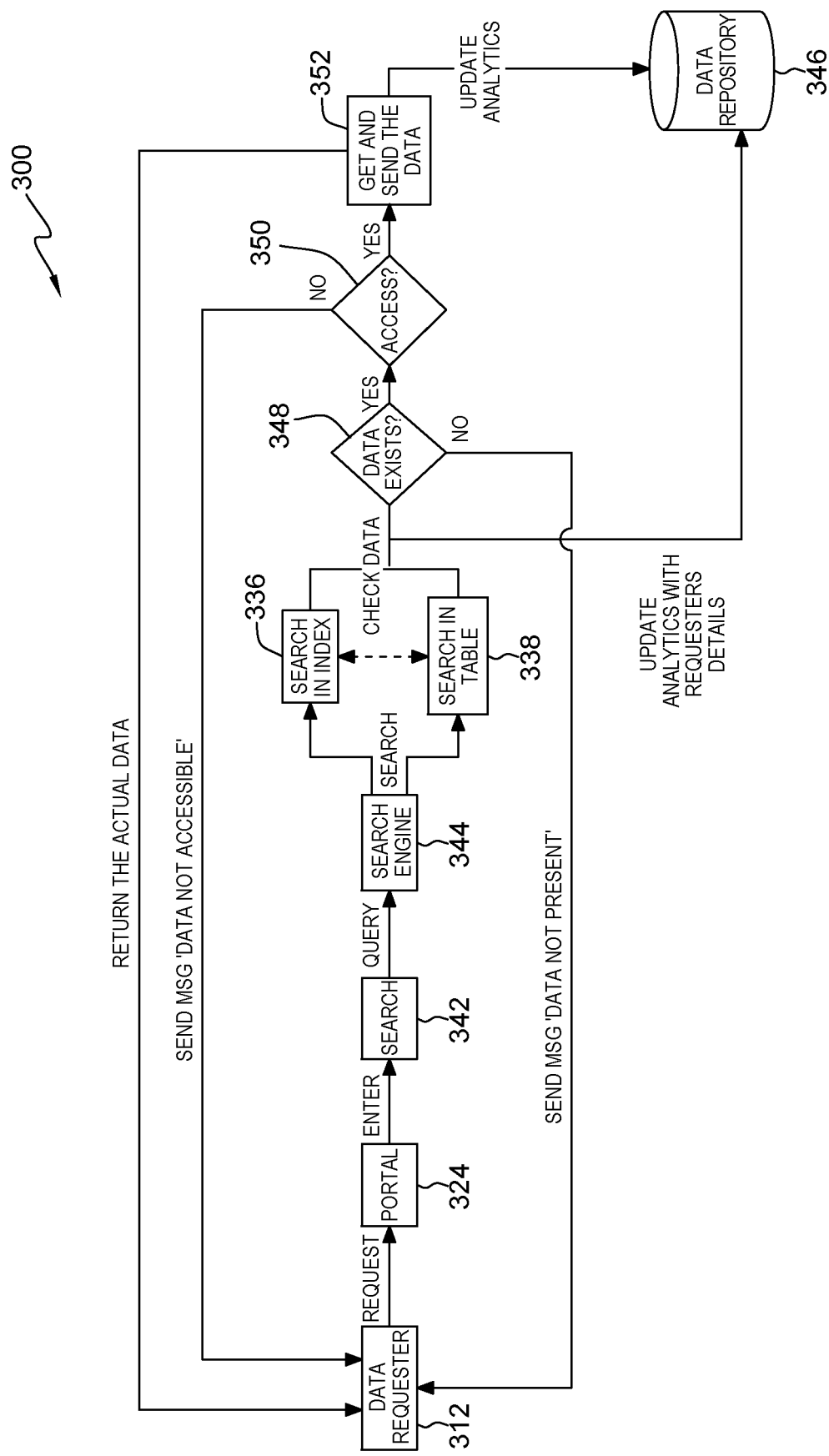
FIG. 3 is a schematic architectural flowchart of using a database system with built-in analytics to respond to a data request, in accordance with an embodiment of the present disclosure.

FIG. 3 is a schematic architectural flowchart 300 of using database system 202 with built-in analytics to respond to a search request. Flowchart 300 can include similar features as requester perspective 206 (shown in FIG. 2). In such situations, similar reference numerals may be used (i.e., numerals that are increased by 100).

In the illustrated embodiment, data requester 312 requests data at portal 324, for example, using a computing device. Data requester 312 then enters search 342 into search engine 344. Then search engine 344 can search in index 336 and/or in table 338. Regardless of whether the execution module can locate the requested data, the execution module updates the relevant anadigits in data repository 346 with metadata about the request and/or data requester 312. In some embodiments, data repository 346 may be similar to or the same as, for example, blocks 220, 222, 236 and/or 238 in FIG. 2. In some embodiments, data repository 346 is a separate database that tracks search queries for data in database system 202 (shown in FIG. 2) (as opposed to storing the requested data itself). Each line of data in data repository 346 can represent, for example, an individual search string or a particular subject matter (e.g., topic or item), and each line of data can include anadigits to track searches, respectively. Furthermore, there can be lines of data in data repository 346 than can represent, for example, types of data (e.g., there can be one line for all public data and another line for all private data, each having its own anadigits).

If the execution module cannot find the requested data at block 348 (348:NO), then a message is returned to data requester 312 (e.g., "Data not present"). If the execution module can find the requested data at block 348 (348:YES), then the execution module determines if the data requester 312 has access to the requested data at block 350. If not (350:NO), then a message is returned to data requester 312 (e.g., "Data not accessible"). If so (350:YES), then the execution module retrieves and sends the data to data requester 312 at block 352 and updates the relevant anadigits in data repository 346 with metadata about the request and the sending of the data. The anadigits in data repository 346 can include, for example, the number of hits on a subject matter, the number of hits on public data, the number of hits on private data, details about data requester 312 (for public data searches and/or for private data searches), the location of the request, and the date and time of the request.

Thereby, data requester 312 can obtain the requested data (assuming they have the authority to receive it), and the relevant anadigits can remain up to date. This can provide a real-time perspective of what is happening inside database system 202. Furthermore, if search engine 344 indirectly finds a pathway to the requested data that is in a data structure that should be unavailable to data requester 312, then the execution module will determine that the requested data is also unavailable to data requester 312 (e.g., if the overlaying data is private, then the underlying data will also be treated as private).

Figure 4:
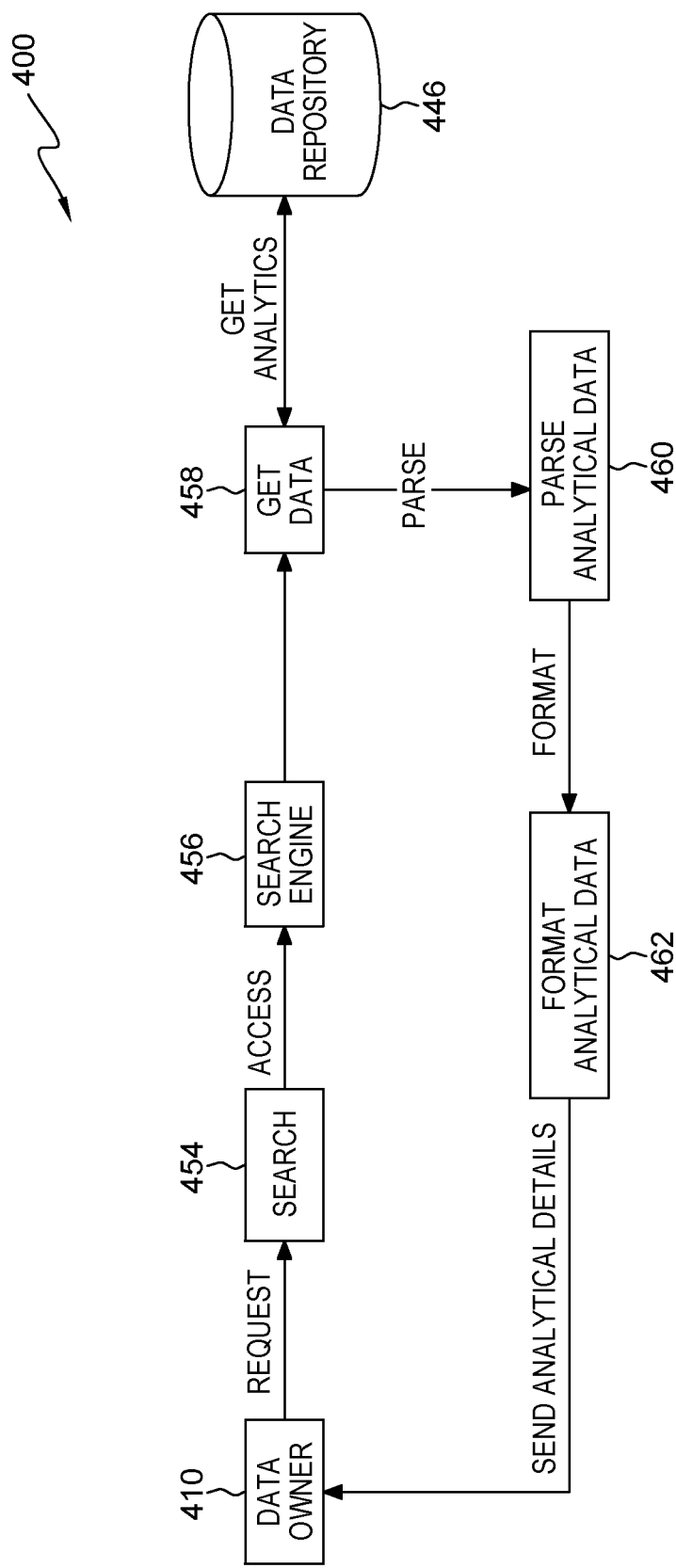
FIG. 4 is a schematic architectural flowchart of using a database system with built-in analytics to respond to an analytics request, in accordance with an embodiment of the present disclosure.

FIG. 4 is a schematic architectural flowchart 400 of using database system 202 with built-in analytics to respond to an analytics request. Flowchart 400 can include similar features as analytics perspective 208 and flowchart 300 (shown in FIGS. 2 and 3, respectively). In such situations, similar reference numerals may be used (i.e., numerals that are increased by 200 or 100, respectively).

In the illustrated embodiment, data owner 410 requests analytics data, for example, using a computing device to enter search 454 into search engine 456. Then the execution module retrieves the analytics data from data repository 446 at block 458. Data repository 446 can be, for example, a database of each search that has been conducted on database system 202. Each line of data can be a unique search query and can include anadigits representing, for example, the number of times the search query was performed and by whom. In some embodiments, each instance of a search is its own line of data, and in some embodiments, identical search queries that are performed on multiple occasions are represented in a single line of data.

At block 460, the requested analytical data is parsed (e.g., using natural language processing techniques), and at block 462, the requested analytical data is formatted for consumption by data owner 410. In blocks 460 and 462, lines of data in data repository 466 can be analyzed and sorted by, for example, a parameter of the data (e.g., the subject matter of the data or whether the data is public or private). This process also includes the anadigits so that the analytics are combined or separated appropriately. Thereby, analytic data such as the number of hits on a subject matter, the number of hits on public data, the number of hits on private data, details about data requesters (for public data searches and/or for private data searches), the location of requests, and the dates and times of requests can be made readily available for data owner 410.

Figure 5:
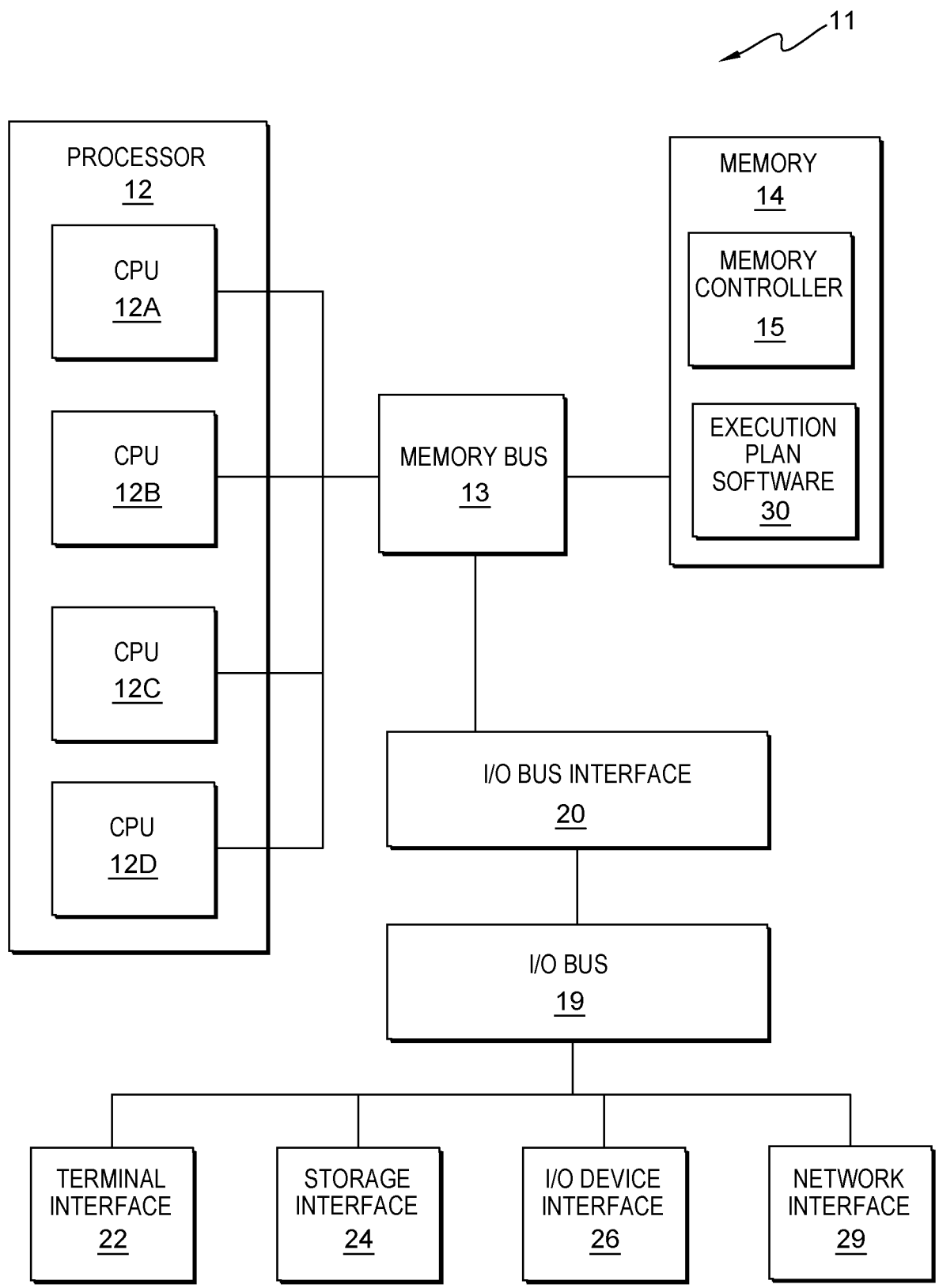
FIG. 5 shows a high-level block diagram of an example computer system that can be used in implementing embodiments of the present disclosure.

Referring now to FIG. 5, shown is a high-level block diagram of an example computer system (i.e., computer) 11 that may be used in implementing one or more of the methods or modules, and any related functions or operations, described herein (e.g., using one or more processor circuits or computer processors of the computer), in accordance with embodiments of the present disclosure. For example, computer system 11 can be used for database 100, database management system 102, and database system 202 (shown in FIGS. 1 and 2, respectively). In some embodiments, the components of the computer system 11 may comprise one or more CPUs 12, a memory subsystem 14, a terminal interface 22, a storage interface 24, an I/O (Input/Output) device interface 26, and a network interface 29, all of which may be communicatively coupled, directly or indirectly, for inter-component communication via a memory bus 13, an I/O bus 19, and an I/O bus interface unit 20.

The computer system 11 may contain one or more general-purpose programmable central processing units (CPUs) 12A, 12B, 12C, and 12D, herein generically referred to as the processer 12. In some embodiments, the computer system 11 may contain multiple processors typical of a relatively large system; however, in other embodiments the computer system 11 may alternatively be a single CPU system. Each CPU 12 may execute instructions stored in the memory subsystem 14 and may comprise one or more levels of on-board cache.

In some embodiments, the memory subsystem 14 may comprise a random-access semiconductor memory, storage device, or storage medium (either volatile or non-volatile) for storing data and programs. In some embodiments, the memory subsystem 14 may represent the entire virtual memory of the computer system 11 and may also include the virtual memory of other computer systems coupled to the computer system 11 or connected via a network. The memory subsystem 14 may be conceptually a single monolithic entity, but, in some embodiments, the memory subsystem 14 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 14 may contain elements for control and flow of memory used by the processor 12. This may include a memory controller 15.

Although the memory bus 13 is shown in FIG. 5 as a single bus structure providing a direct communication path among the CPUs 12, the memory subsystem 14, and the I/O bus interface 20, the memory bus 13 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 20 and the I/O bus 19 are shown as single respective units, the computer system 11 may, in some embodiments, contain multiple I/O bus interface units 20, multiple I/O buses 19, or both. Further, while multiple I/O interface units are shown, which separate the I/O bus 19 from various communications paths running to the various I/O devices, in other embodiments some or all of the I/O devices may be connected directly to one or more system I/O buses.

In some embodiments, the computer system 11 may be a multi-user mainframe computer system, a single-user system, or a server computer or similar device that has little or no direct user interface but receives requests from other computer systems (clients). Further, in some embodiments, the computer system 11 may be implemented as a desktop computer, portable computer, laptop or notebook computer, tablet computer, pocket computer, telephone, smart phone, mobile device, or any other appropriate type of electronic device.

In the illustrated embodiment, memory subsystem 14 further includes execution plan software 30. The execution of execution plan software 30 (for example, using the execution module) enables computer system 11 to perform one or more of the functions described above, for example, to manage a database with built-in analytics, including providing registration perspective 204, requester perspective 206, and analytics perspective 208 (shown in FIG. 2).

It is noted that FIG. 5 is intended to depict representative components of an exemplary computer system 11. In some embodiments, however, individual components may have greater or lesser complexity than as represented in FIG. 5, components other than or in addition to those shown in FIG. 5 may be present, and the number, type, and configuration of such components may vary.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
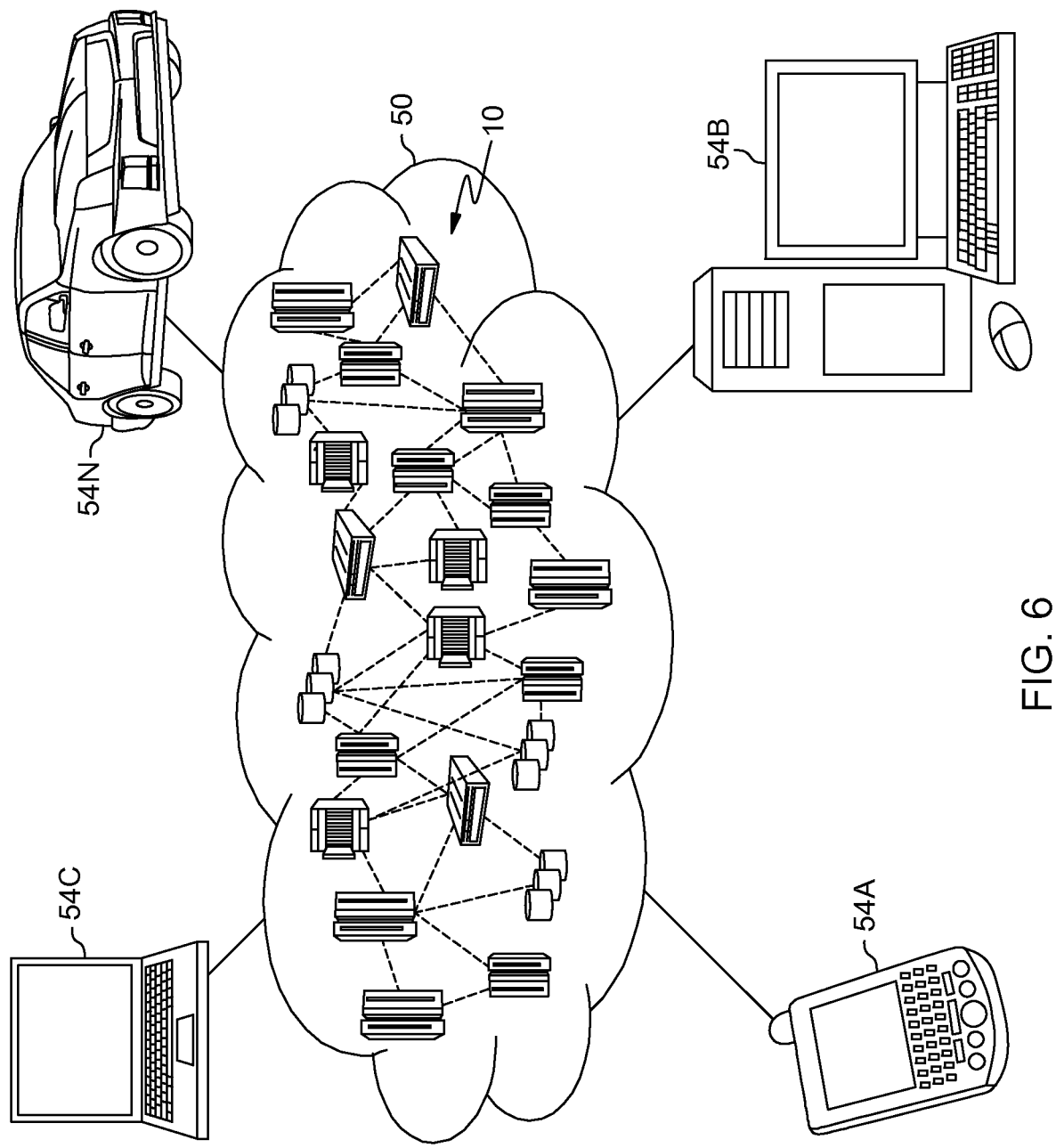
FIG. 6 shows a cloud computing environment, in accordance with an embodiment of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
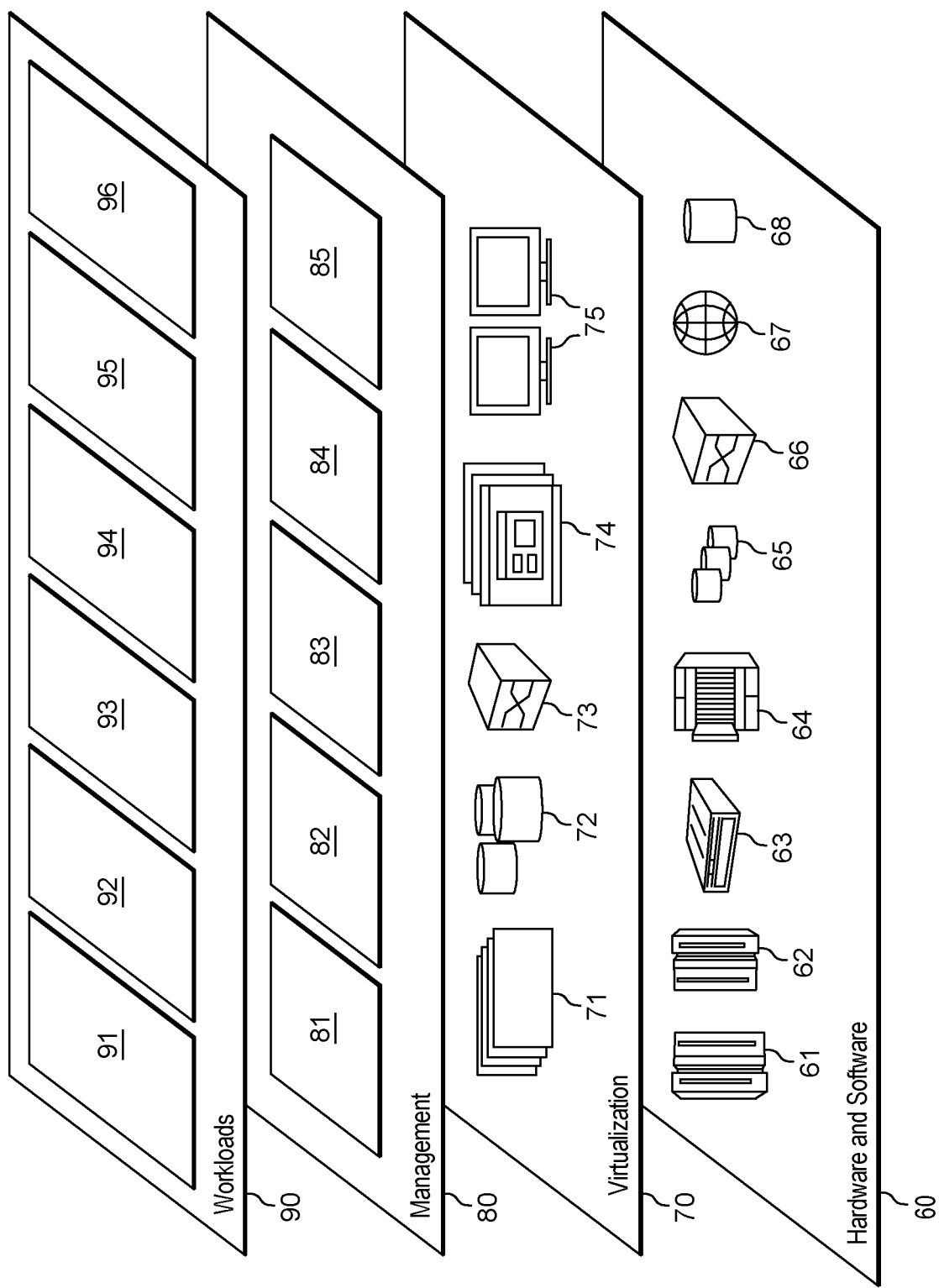
FIG. 7 shows abstraction model layers, in accordance with an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. s depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and execution module 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for facilitating processing within a computing environment, the computer-implemented method comprising:
   referencing a database with built-in analytics within the database, the built-in analytics:
   selecting a plurality of data lines in the database for storing in the database corresponding analytics data generated by the built-in analytics within the database, each data line corresponding to an original data portion; and
   adding to each of the selected plurality of data lines in the database, a field for an additional data portion comprising a set of additional bytes containing analytics data added and maintained current by the built-in analytics within the database about a corresponding one of the plurality of data lines and storing, by the built-in analytics of the database, the added sets of additional bytes of the additional data portions with the respective original data portions as part of the selected plurality of data lines in the database;
   using the built-in analytics of the database in responding to analytics requests, the using comprising:
   receiving, at the database, an analytics request associated with a selected data line from the database;
   reading the set of additional bytes from the database corresponding to the selected data line, the set of additional bytes read from the database containing the analytics data added and maintained current by the built-in analytics of the database for the selected data line; and
   parsing and formatting the set of additional bytes read from the database to generate at the database an analytics reply to the analytics request,
   wherein each of the plurality of data lines represents a search query, and
   wherein the analytics data comprises a number of search query requests on a subject matter and a number of search query requests for private data.

2. The method of claim 1, further comprising:
   determining whether original data corresponding to the selected data line is public or private based on reading the set of additional bytes; and
   sending out the original data from the database in response to determining that the original data is public.

3. The method of claim 2, wherein the original data is sent without the set of additional bytes.

4. The method of claim 1, further comprising:
   updating, by the built-in analytics within the database, the set of additional bytes to increment a number of requests for the selected data line, in response to receiving the request to retrieve the selected data line.

5. The method of claim 1, wherein a data owner selected the plurality of data lines for analytics, the method further comprising:
   receiving the analytics request from the data owner to receive analytics data regarding a parameter of at least some of the selected plurality of data lines;
   analyzing each set of additional bytes to determine which of the selected plurality of data lines corresponds to the parameter;
   formatting the sets of additional bytes from the selected plurality of data lines that correspond to the parameter to generate the analytics data; and
   sending the analytics data to the data owner as part of the analytics reply.

6. The method of claim 5, wherein the analytics data further comprises analytics data selected from the group consisting of: a number of requests for public data, details about data requesters, locations of requests, and dates and times of requests.

7. A computer system comprising a memory and a processor, wherein the memory stores program instructions executable by the processor, execution of the program instructions causes the processor to:
   reference a database with built-in analytics within the database, the built-in analytics to:
   select a plurality of data lines in the database for storing in the database corresponding analytics data generated by the built-in analytics within the database, each data line corresponding to an original data portion; and
   add to each of the selected plurality of data lines in the database, a field for an additional data portion comprising a set of additional bytes containing analytics data added and maintained current by the built-in analytics within the database about a corresponding one of the plurality of data lines and storing, by the built-in analytics of the database, the added sets of additional bytes of the additional data portions with the respective original data portions as part of the selected plurality of data lines in the database;

use the built-in analytics of the database in responding to analytics requests, including to:
  receive, at the database, an analytics request associated with a selected data line from the database;
  read the set of additional bytes from the database corresponding to the selected data line, the set of additional bytes read from the database containing the analytics data added and maintained current by the built-in analytics of the database for the selected data line; and
  parse and format the set of additional bytes read from the database to generate at the database an analytics reply to the analytics request,
  wherein each of the plurality of data lines represents a search query, and
  wherein the analytics data comprises a number of search query requests on a subject matter and a number of search query requests for private data.

8. The computer system of claim 7, wherein execution of the program instructions further causes the processor to:
  determine whether original data corresponding to the selected data line is public or private based on reading the set of additional bytes; and
  send out the first original data from the database in response to determining that the original data is public.

9. The computer system of claim 8, wherein the original data is sent without the set of additional bytes.

10. The computer system of claim 7, wherein execution of the program instructions further causes the processor to:
  update, by the built-in analytics within the database, the set of additional bytes to increment a number of requests for the selected data line, in response to receiving the request to retrieve the selected data line.

11. The computer system of claim 7, wherein a data owner selected the plurality of data lines for analytics, wherein execution of the program instructions further causes the processor to:
  receive the analytics request from the data owner to receive analytics data regarding a parameter of at least some of the selected plurality of data lines;
  analyze each set of additional bytes to determine which of the selected plurality of data lines corresponds to the parameter;
  format the sets of additional bytes from the selected plurality of data lines that correspond to the parameter to generate the analytics data; and
  send the analytics data to the data owner as part of the analytics reply.

12. The computer system of claim 11, wherein the analytics data further comprises analytics data selected from the group consisting of: a number of requests for public data, details about data requesters, locations of requests, and dates and times of requests.

13. A computer program product for facilitating processing within a computing environment, the computer program product being non-transitory and comprising a computer readable storage medium having program instructions embodied therewith, the program instructions executable by a processor to cause the processor to:
  reference a database with built-in analytics within the database, the built-in analytics to:
    select a plurality of data lines in the database for storing in the database corresponding analytics data generated by the built-in analytics within the database, each data line corresponding to an original data portion; and
    add to each of the selected plurality of data lines in the database, a field for an additional data portion comprising a set of additional bytes containing analytics data added and maintained current by the built-in analytics within the database about a corresponding one of the plurality of data lines and storing, by the built-in analytics of the database, the added sets of additional bytes of the additional data portions with the respective original data portions as part of the selected plurality of data lines in the database;
  use the built-in analytics of the database in responding to analytics requests, including to:
    receive, at the database, an analytics request associated with to retrieve a selected data line from the database;
    read the set of additional bytes from the database corresponding to the selected data line, the set of additional bytes read from the database containing the analytics data added and maintained current by the built-in analytics of the database system for the selected data line; and
    parse and format the set of additional bytes read from the database to generate at the database an analytics reply to the analytics request,
    wherein each of the plurality of data lines represents a search query, and
    wherein the analytics data comprises a number of search query requests on a subject matter and a number of search query requests for private data.

14. The computer program product of claim 13, wherein the program instructions further cause the processor to:
  determine whether original data corresponding to the selected data line is public or private based on reading the set of additional bytes; and
  send out the original data from the database in response to determining that the original data is public.

15. The computer program product of claim 14, wherein the original data is sent without the set of additional bytes.

16. The computer program product of claim 15, wherein the program instructions further cause the processor to:
  update, by the built-in analytics within the database, the set of additional bytes to increment a number of requests for the selected data line, in response to receiving the request to retrieve the selected data line.

17. The computer program product of claim 13, wherein a data owner selected the plurality of data lines for analytics, wherein the program instructions further cause the processor to:
  receive the analytics request from the data owner to receive analytics data regarding a parameter of at least some of the selected plurality of data lines;
  analyze each set of additional bytes to determine which of the selected plurality of data lines corresponds to the parameter;
  format the sets of additional bytes from the selected plurality of data lines that correspond to the parameter to generate the analytics data; and
  send the analytics data to the data owner as part of the analytics reply:
  wherein the analytics data further comprises analytics data selected from the group consisting of: a number of requests for public data, details about data requesters, locations of requests, and dates and times of requests.

* * * * *